US007742274B2

(12) United States Patent
Utschig

(10) Patent No.: US 7,742,274 B2
(45) Date of Patent: Jun. 22, 2010

(54) X-RAY DETECTOR GROUNDING AND THERMAL TRANSFER SYSTEM AND METHOD

(75) Inventor: Michael John Utschig, Wauwatosa, WI (US)

(73) Assignee: General Electric Company, Schenectady, NY (US)

( * ) Notice: Subject to any disclaimer, the term of this patent is extended or adjusted under 35 U.S.C. 154(b) by 657 days.

(21) Appl. No.: 11/742,491

(22) Filed: Apr. 30, 2007

(65) Prior Publication Data

US 2009/0015981 A1 Jan. 15, 2009

(51) Int. Cl.
*H02H 47/00* (2006.01)

(52) U.S. Cl. .................................................... 361/220

(58) Field of Classification Search .................. 361/220
See application file for complete search history.

(56) References Cited

U.S. PATENT DOCUMENTS 4,933,246 A * 6/1990 Teuscher ..................... 430/64
5,034,295 A * 7/1991 Allen et al. .............. 430/58.65
5,244,762 A * 9/1993 Spiewak et al. ............... 430/64

* cited by examiner

*Primary Examiner*—Stephen W Jackson
(74) *Attorney, Agent, or Firm*—Fletcher Yoder

(57) ABSTRACT

A method is provided for conducting electricity and thermal energy in an imaging system. The method includes providing a conductive path between a plurality of components and a support structure of the imaging system, in which the support structure comprises a material consisting essentially of conductive elements disposed in a non-conductive material matrix. An imaging system is provided, with a support structure of a conductive elements disposed in a non-conductive material matrix, a plurality of components coupled to the support structure, an imaging panel disposed in the housing, and a conductive path extending through the non-conductive exterior to engage the conductive elements, wherein the conductive path is configured to conduct heat, electricity, or a combination thereof, with one or more components of the imaging system. Another imaging system is provided, with a portable panel-shaped housing, a support structure including a compound plastic, a composite material, or a combination thereof, a conductive path penetrating a non-conductive exterior to a conductive interior of the compound plastic of composite material, and an imaging panel coupled to the support structure via the conductive path.

27 Claims, 4 Drawing Sheets

X-RAY DETECTOR GROUNDING AND THERMAL TRANSFER SYSTEM AND METHOD

BACKGROUND

The invention relates generally to imaging devices and, more particularly, to the electrical and thermal conduction in portable digital x-ray detectors.

Portable imaging devices, such as portable x-ray detectors, often contain multiple electrical components, such as circuit boards, that require sufficient grounding to prevent electronic noise in images produced by the detector. Further, some electrical components may be sensitive to the heat generated during operation of the detector. Typically, the portable imaging devices include metal support structures to support the electrical components and provide conductive paths to provide grounding and thermal energy transfer. For example, these metal support structures may be constructed from multiple pieces of magnesium. Although the metal support structures provide good electrical and thermal conduction, these structures are generally very heavy and add undesired weight to the portable imaging device.

BRIEF DESCRIPTION

Certain embodiments commensurate in scope with the originally claimed invention are set forth below. It should be understood that these embodiments are presented merely to provide the reader with a brief summary of certain forms the invention might take and that these embodiments are not intended to limit the scope of the invention. Indeed, the invention may encompass a variety of features that may not be set forth below.

In accordance with a first embodiment, a method for conducting electricity and thermal energy is provided, including providing a conductive path between a plurality of components and a support structure of the imaging system, wherein the support structure comprises a material consisting essentially of conductive elements disposed in a non-conductive material.

In accordance with a second embodiment, an imaging system is provided with a support structure comprising a material consisting essentially of conductive elements disposed in a non-conductive material, wherein the material has a non-conductive exterior and a conductive path extending through the non-conductive exterior to engage the conductive elements, wherein the conductive path is configured to conduct heat, electricity, or a combination thereof, with one or more components of the imaging system.

In accordance with a third embodiment, an imaging system is provided with a portable panel-shaped housing, a support structure comprising a compounded plastic, a composite material, or a combination thereof, and a conductive path penetrating a non-conductive exterior to a conductive interior of the compound plastic the composite material, or the combination thereof, and an imaging panel coupled to the support structure via the conductive path.

DRAWINGS

These and other features, aspects, and advantages of the present invention will become better understood when the following detailed description is read with reference to the accompanying drawings in which like characters represent like parts throughout the drawings, wherein.

Figure 6:
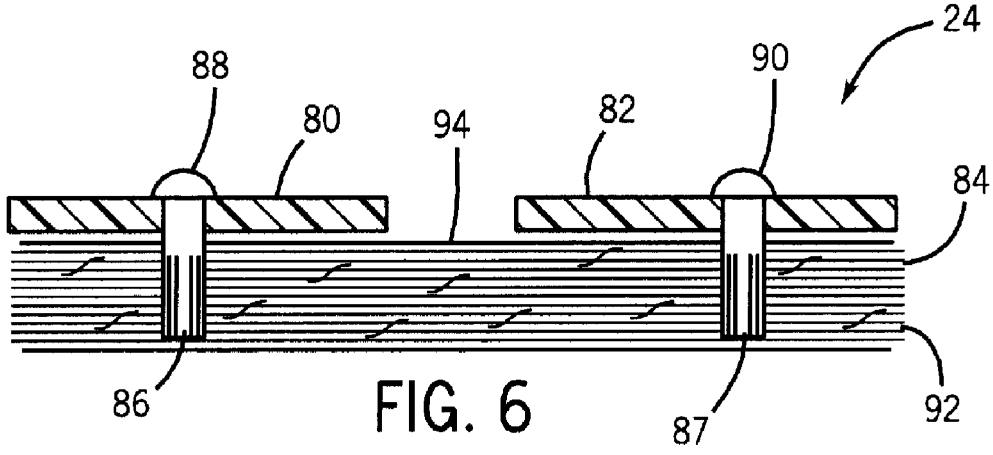
Figure 7:
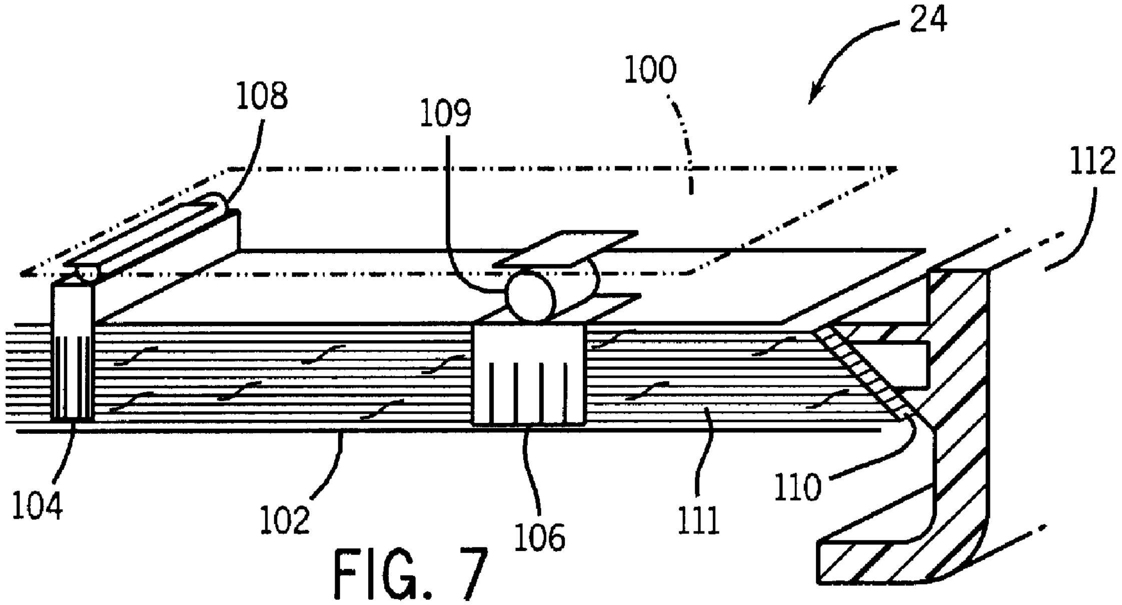

FIG. 6 is a cross-sectional view of a composite support structure with toothed fasteners showing a conduction path between electrical components in accordance with an embodiment of the present technique; and FIG. 7 is a cross-sectional view of a composite support structure with toothed fasteners, a thermally conductive interface material, and an angled edge in accordance with an embodiment of the present technique.

DETAILED DESCRIPTION

In certain embodiments, as discussed below, internal electrical components of an imaging device are disposed within an external enclosure and coupled to a support structure disposed inside the external enclosure and between the internal components. A single continuous support structure may be disposed between the internal components and the external enclosure. The support structure may provide a conduction path for conducting electrical and thermal energy from the electrical components, thereby minimizing electrical noise and reducing the possibility of damage to the internal components. In accordance with the embodiments described herein, the support structure comprises a material composition having a non-conductive matrix with conductive elements disposed in the non-conductive matrix. The material composition may be a compounded plastic, or a composite material, or a combination thereof. As the outer portion or exterior layer of these material compositions is non-conductive, in order to create conductive paths to and from the electrical components coupled to the support structures, various novel techniques described herein provide for creation of conductive entrance paths through the material compositions. These conductive paths provide for conduction of electricity, e.g., grounding, and conduction of thermal energy or heat. As discussed below, in certain embodiments the conductive path may be created in the material composition by: extending a conductive interface structure into the support structure to engage the conductive elements; inserting or overmolding a conductive stud, e.g. a metal stud, into the support structure; applying a conductive interface material to the conductive interface structure; abrading, sanding, or machining the non-conductive surface of the support structure to create a conductive surface having some of the conductive elements exposed; and applying a conductive interface material to the abraded surface.

The portable imaging device described herein may be used in a variety of imaging systems, such as medical imaging systems and non-medical imaging systems. For example, medical imaging systems include radiology and mammography (i.e. digital x-ray). These various imaging systems, and the different respective topologies, are used to create images or views of a patient for clinical diagnosis based on the attenuation of radiation (e.g., x-rays) passing through the patient. Alternatively, imaging systems may also be utilized in non-medical applications, such as in industrial quality control or in security screening of passenger luggage, packages, and/or cargo. In such applications, acquired data and/or generated images may be used to detect objects, shapes or irregularities which are otherwise hidden from visual inspection and which are of interest to the screener. In each of these imaging systems, the portable imaging device may include internal support structures to support internal electrical components and provide grounding and thermal energy or hear dissipation, thereby minimizing electronic noise in the final image and reducing the possibility of damage due to overheating.

Depending on the type of imaging device, the internal components may include a variety of circuits, panels, detectors, sensors, and other relatively delicate components. X-ray imaging systems, both medical and non-medical, utilize an x-ray tube to generate the x-rays used in the imaging process. The generated x-rays pass through the imaged object where they are absorbed or attenuated based on the internal structure and composition of the object, creating a matrix or profile of x-ray beams of different strengths. The attenuated x-rays impinge upon an x-ray detector designed to convert the incident x-ray energy into a form usable in image reconstruction. Thus the x-ray profile of attenuated x-rays is sensed and recorded by the x-ray detector. X-ray detectors may be based on film-screen, computed radiography (CR) or digital radiography (DR) technologies. In film-screen detectors, the x-ray image is generated through the chemical development of the photosensitive film after x-ray exposure. In CR detectors, a storage phosphor imaging plate captures the radiographic image. The plate is then transferred to a laser image reader to “release” the latent image from the phosphor and create a digitized image. In DR detectors, a scintillating layer absorbs x-rays and subsequently generates light, which is then detected by a two-dimensional flat panel array of silicon photo-detectors. Absorption of light in the silicon photodetectors creates electrical charge. A control system electronically reads out the electrical charge stored in the x-ray detector and uses it to generate a viewable digitized x-ray image.

In view of the various types of imaging systems and potential applications, the following discussion focuses on embodiments of a digital flat panel, solid-state, indirect detection, portable x-ray detector for use with a mobile x-ray imaging system. However, other embodiments are applicable with other types of medical and non-medical imaging devices, such as direct detection digital x-ray detectors. Additionally, other embodiments may be used with stationary or fixed room x-ray imaging systems. Further, the present application makes reference to an imaging “subject” and an imaging “object”. These terms are not mutually exclusive and, as such, use of the terms is interchangeable and is not intended to limit the scope of the appended claims.

Figure 1:
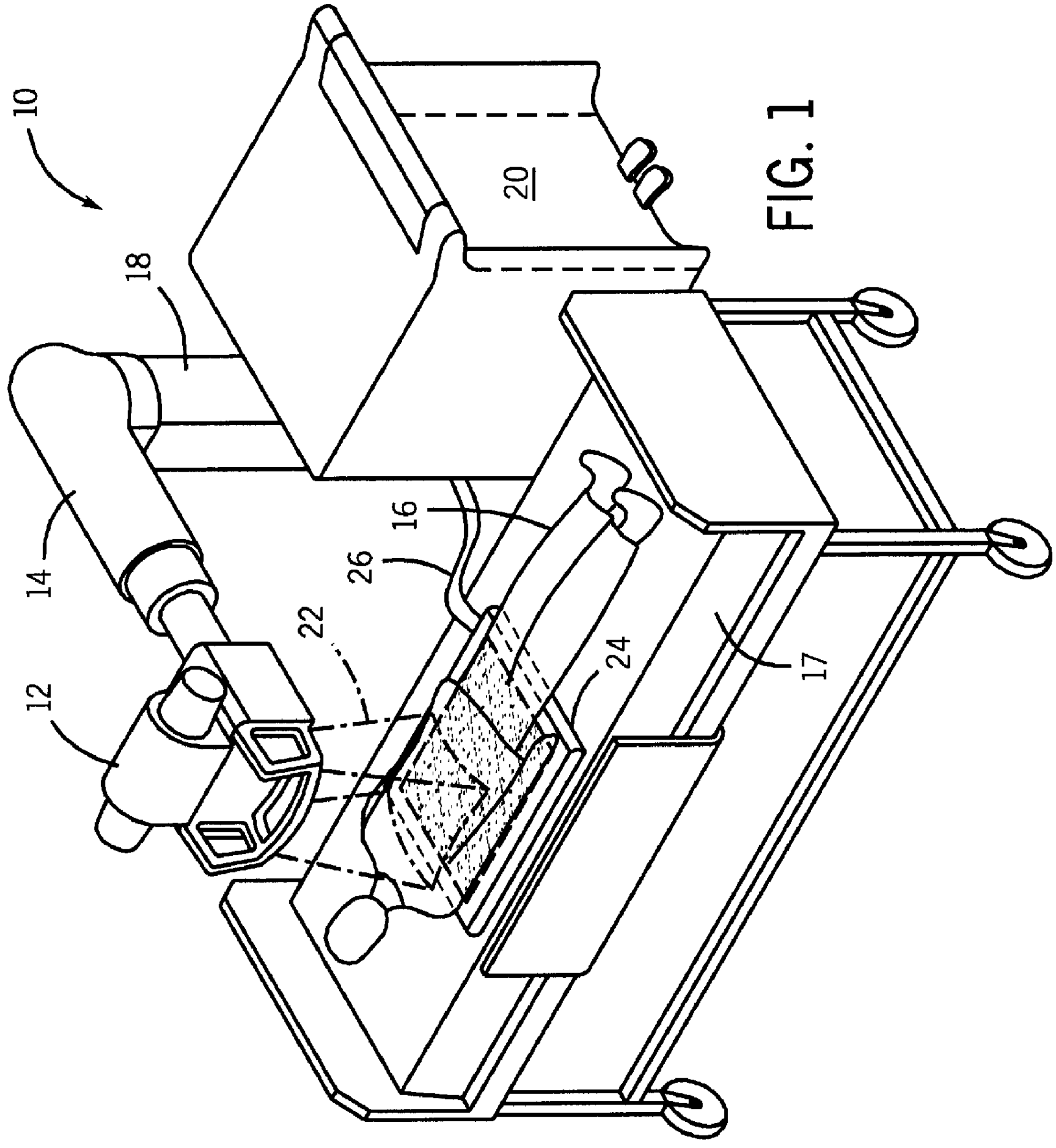
FIG. 1 is a perspective view of an embodiment of a mobile x-ray imaging system using a portable digital x-ray detector.

Turning now to FIG. 1, an exemplary mobile x-ray imaging system 10 employing a portable x-ray detector is illustrated. In the illustrated embodiment, the mobile x-ray imaging system 10 includes a radiation source 12, such as an x-ray source, mounted or otherwise secured to an end of horizontal arm 14. The arm 14 allows the x-ray source 12 to be variably positioned above a subject 16, resting on a patient table or bed 17, in such a manner so as to optimize irradiation of a particular area of interest. The x-ray source 12 may be mounted through a gimbal-type arrangement in column 18. In this regard, the x-ray source 12 may be rotated vertically from a rest or park position on the mobile x-ray unit base 20 to the appropriate position above the subject 16 to take an x-ray exposure of the subject 16. The rotational movement of column 18 may be limited to a value of 360 degrees or less to prevent entanglement of high voltage cables used to provide electrical power to the x-ray source 12. The cables may be connected to a utility line source or a battery in the base 20 to energize the x-ray source 12 and other electronic components of the system 10.

The x-ray source 12 projects a collimated cone beam of radiation 22 toward the subject 16 to be imaged. Accordingly, medical patients and luggage, packages, and other subjects or objects may be non-invasively inspected using the exemplary x-ray imaging system 10. A portable x-ray detector 24 placed beneath the subject 16 acquires the attenuated radiation and generates a detector output signal. The detector output signal may then be transmitted to the mobile imaging system 10 over a wired or a wireless link 26. The system 10 may be equipped with or connectable to a display unit for the display of images captured from the imaging subject 16.

Figure 2:
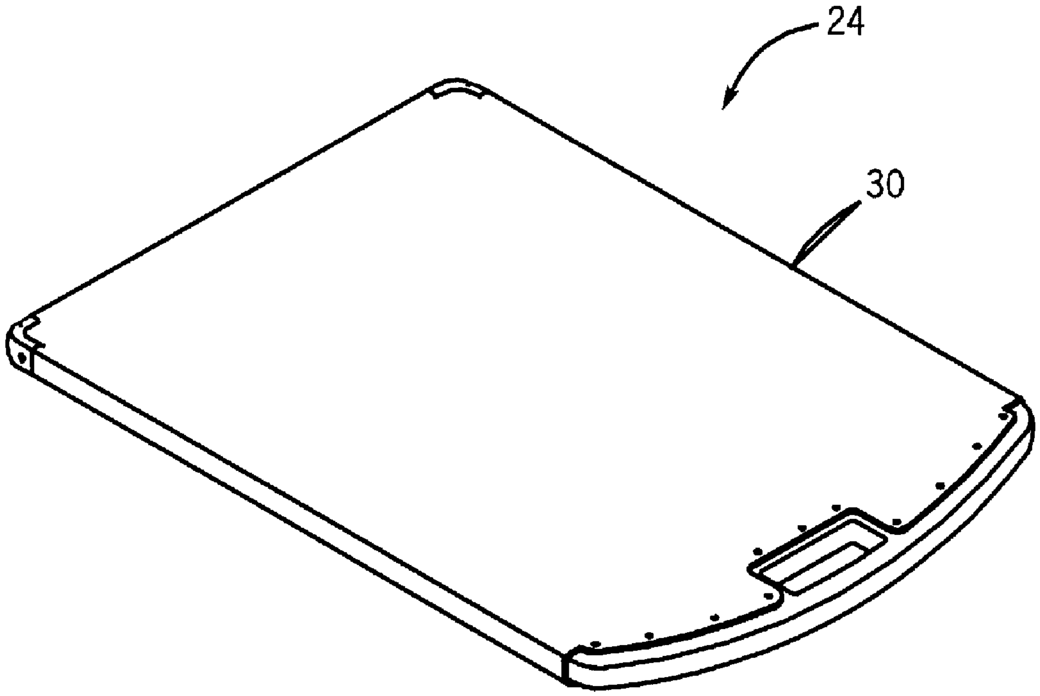
FIG. 2 is a perspective view of the portable flat panel digital x-ray detector of the imaging system of FIG. 1.

The exemplary imaging system 10, and other imaging systems based on radiation detection, employs the portable x-ray detector 24, such as a flat panel, digital x-ray detector. A perspective view of such an exemplary flat panel, digital x-ray detector 24 is provided in FIG. 2. However, as mentioned above, other embodiments of the detector 24 may include other imaging modalities in both medical and non-medical applications. The exemplary flat panel, digital x-ray detector 24 includes a detector subsystem for generating electrical signals in response to reception of incident x-rays.

In accordance with certain embodiments, a single-piece protective housing 30 provides an external enclosure to the detector subsystem, so as to protect the fragile detector components from damage when exposed to an external load or an impact. In addition, as discussed in further detail below, the detector 24 may include internal structures to protect the internal components within the single-piece protective housing 30. The protective enclosure 30 may be formed of materials such as a metal, a metal alloy, a plastic, a composite material, or a combination of the above. For example, in certain embodiments, the enclosure 30 may be entirely or substantially made of a material composition having a nonconductive matrix with conductive elements disposed therein. Again, the material composition may include a compounded plastic, a composite material, or a combination thereof. In some embodiments, the material has low x-ray attenuation characteristics. Additionally, the protective enclosure 30 may be designed to be substantially rigid with minimal deflection when subjected to an external load.

Figure 3:
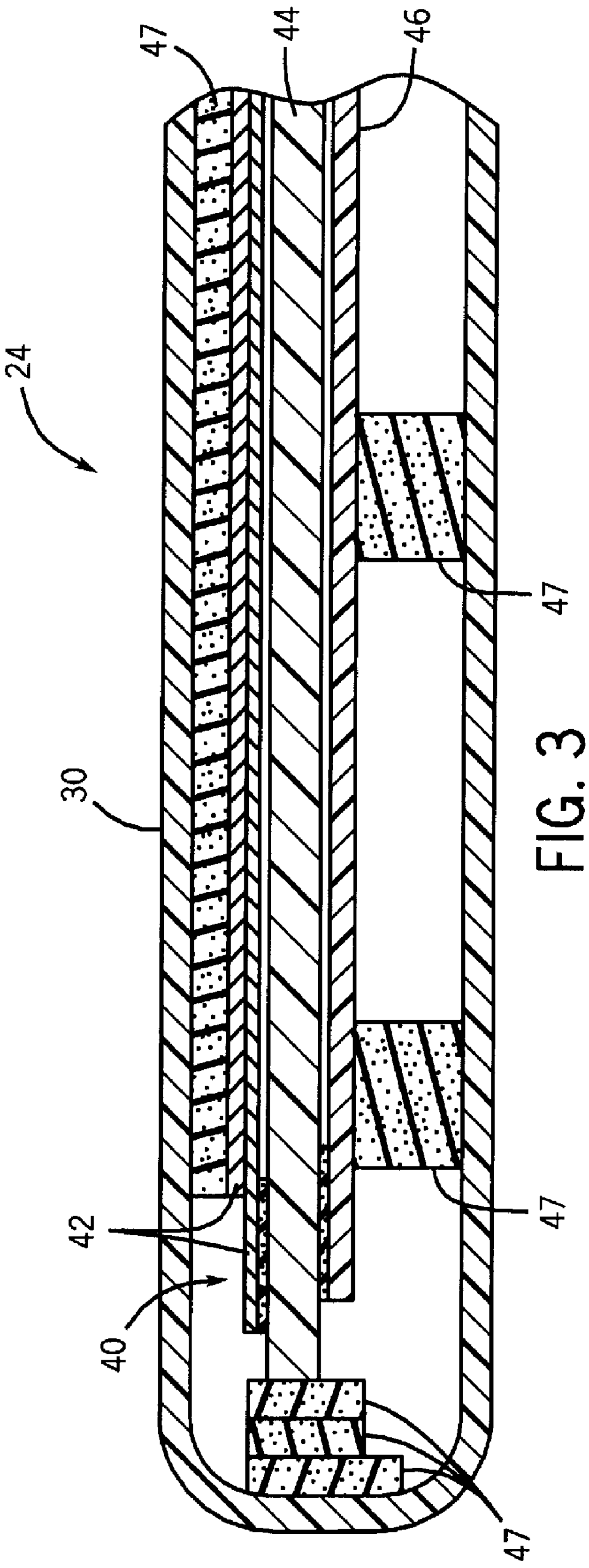
FIG. 3 is a cross-sectional view of an embodiment of the portable flat panel digital x-ray detector illustrated in FIG. 2.

Referring now to FIG. 3, a cross-sectional view of an embodiment of the portable flat panel digital x-ray detector 24 is shown. The illustrated detector subsystem 40 includes an imaging panel 42, an electronics support structure 44, and associated electronics 46. Additional internal supports 47 may be provided to physically support the detector subsystem 40 inside the enclosure 30.

The imaging panel 42 includes a scintillator layer for converting incident x-rays to visible light. The scintillator layer is designed to emit light proportional to the energy and the amount of the x-rays absorbed. As such, light emissions will be higher in those regions of the scintillator layer where either more x-rays were received or the energy level of the received x-rays was higher. Since the composition of the subject will attenuate the x-rays projected by the x-ray source to varying degrees, the energy level and the amount of the x-rays impinging upon the scintillator layer will not be uniform across the scintillator layer. This variation in light emission will be used to generate contrast in the reconstructed image.

The light emitted by the scintillator layer is detected by a photosensitive layer on the 2D flat panel substrate. The photosensitive layer includes an array of photosensitive elements or detector elements to store electrical charge in proportion to the quantity of incident light absorbed by each detector elements. Generally, each detector element has a light sensitive region and a region including electronics to control the storage and output of electrical charge from that detector element. The light sensitive region may be composed of a photodiode, which absorbs light and subsequently creates and stores electronic charge. After exposure, the electrical charge in each detector element is read out using logic-controlled electronics 46.

The various components of detector subsystem 40 may be protected or secured against the enclosure 30 by one or more internal supports 47 disposed about all sides of the internal components within the external protective enclosure 30. The supports 47 may include a conductive pathway (or may be formed of a conductive material) to facilitate electrical and thermal conduction between the internal components, e.g., 42, 44, and 46, and the enclosure 30. In some embodiments, the internal supports 47 may be formed from a foam, a foam rubber, or a combination thereof.

The imaging panel 42 and associated electronics 46 are supported by a thin and lightweight electronics support structure 44. The readout electronics and other electronics 46 are disposed on the electronics support structure 44 on the side opposite from the imaging panel 42. That is, the electronics support structure 44 mechanically isolates the imaging components of the imaging panel 42 from the readout electronics 46.

In this embodiment and in accordance with the present invention, the electronics support structure 44 is substantially formed of a material composition having a non-conductive matrix material and conductive elements disposed in the non-conductive matrix material. The material composition may be described as a compounded plastic, or a composite material, or a combination thereof In one embodiment, the electronics support structure 44 may be substantially formed of a compounded plastic having a base resin of polycarbonate and additives of stainless steel fibers, carbon powder, or carbon fibers, or a combination thereof. In other embodiments, the electronics support structure 44 may be substantially formed of composite materials having an epoxy matrix and graphite, or carbon fibers, or a combination thereof. The electronics support structure 44 provides a lightweight yet stiff assembly to also serve as a support for imaging panel 42. The construction of electronics support structure 44 from non-metallic materials (as opposed to conventional construction entirely with metal or metal alloys) in combination with other optimized materials used in construction of additional components or structures of the x-ray detector 24 reduces weight while providing mechanical stiffness and energy absorption capability.

The compounded plastics used to construct the electronic support structure 44 may include a base resin and additives or fillers. The base resin may be a thermoset or thermoplastic, such as polycarbonate. The compounded plastic may be injection molded to form the thin and lightweight support structure 44. In certain embodiments the surface of an injection molded support structure 44 is primarily resin material and therefore is highly non-conductive. The additives may be stainless steel fibers, carbon powder, carbon fibers, or any conductive additive or filler that may be added to the base resin to provide conductive capabilities while maintaining the advantageous physical properties of the non-conductive plastic resin.

The composite materials used to construct the electronics support structure may be combinations of a matrix having a reinforcement material. The matrix material, such as an epoxy, surrounds and supports the reinforcement material. The reinforcement materials, such as organic or inorganic fibers or particles, are bound together by the matrix of the composite. For fiber reinforcements, the direction the individual fibers may be oriented to control the rigidity and the strength of the composite. Further, the composite may be formed of several individual layers with the orientation or alignment of the reinforcement layers varying through the thickness of composite. The layers of the composite could use multiple materials in different forms (particles, fibers, fabric, thin foils, etc.). In one embodiment, the composite material for the electronics support structure may be an epoxy matrix with layers of carbon fibers. However, any non-conductive matrix and conductive fibers may be used.

As discussed above, the imaging panel 42 and the associated electronics 46 may be coupled to other structures in the system for grounding and conduction of thermal energy. In certain embodiments, the electronics support structure 44 provides these grounding and conduction functions, as both the imaging panel 42 and associated electronics 46 are attached to the electronics support structure 44. However, non-metallic materials have relatively poor conductivity compared to the conventional metallic materials used to form electronics support structures 44, such as metals and metal alloys. Adding metallic materials onto the electronics support structure 44 adds weight to the support structure 44 and negates the weight advantages of the generally non-metallic material compositions. As described in detail below in FIGS. 4-7, entrance paths may be created in the non-metallic materials to provide for conduction through the conductive cores or fibers. Such conduction paths may conduct electricity, thermal energy (heat) or both, in order to reduce electrical noise generated by the components and transport the heat away from the components and spread it throughout the detector structure for better absorption and dissipation.

Figure 4A:
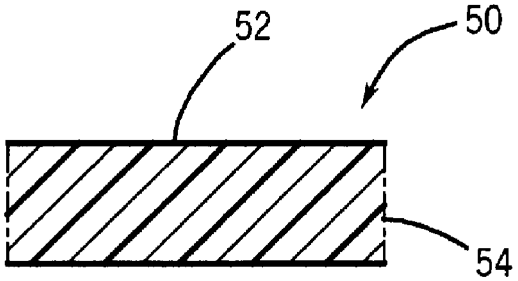
FIG. 4A is a cross-sectional view of a compounded plastic support structure used in accordance with an embodiment of the present technique.
Figure 4B:
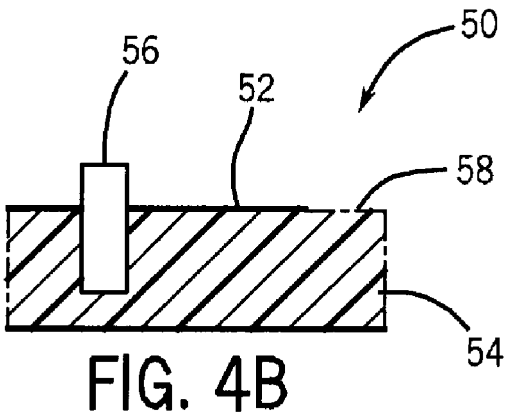
FIG. 4B is a cross-sectional view of a compounded plastic support structure with an overmolded stud and abraded surface in accordance with an embodiment of the present technique.

Turning now to FIG. 4A, a cross-sectional view of a compounded plastic 50 having a non-conductive outer surface 52, such as polycarbonate, and a conductive core 54, such as carbon fibers, used in the construction of electronics support structure 44 is shown. As discussed above, the non-conductive surface 52 of the compounded plastic may be any non-conductive plastic resin or polymer, and the conductive core material may be additives such as carbon fibers, carbon powder, stainless steel fibers, or a combination of any of these materials. FIG. 4B depicts techniques for forming conductive paths in the compounded plastic 50 in accordance with the present invention. In one embodiment, a conductive interface structure 56, such as a metal ring or stud, is overmolded into the compounded plastic to form a conductive entrance path into the compounded plastic 50. As a result of this process, the conductive interface structure 56 is in contact with the conductive elements 54 of the compounded plastic 50. Electrical components that require grounding into the electronics support structure 46 can be coupled to the conductive interface structure 56 to access the conductive path. For example, a conductive path between two overmolded parts about 20 cm apart in the compounded plastic may have a resistance less than 5 Ohm.

Alternatively, in some embodiments, the non-conductive surface 52 may be abraded, sanded, or machined to expose the conductive elements 54 of the compounded plastic 50. The abraded surface 58 can be used as an entrance path to the conductive elements 56, thereby creating a conductive path from any materials or components coupled to the plastic at the abraded surface 58. Such components or materials may be coupled through the use of a conductive interface material, such as conductive tape or conductive filling material. Further, both an overmolded part 56 and an abraded surface 58 may be created in the composite plastic 50 depending on the structural and electrical requirements of the components attached to the electronics support structure 44.

Figure 5A:
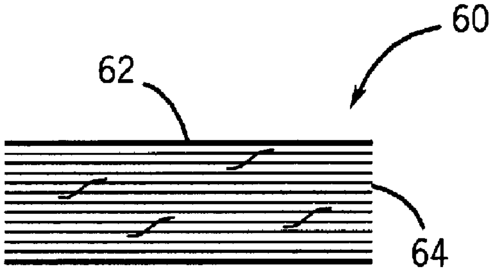
FIG. 5A is a cross-sectional view of a composite support structure used in accordance with an embodiment of the present technique.
Figure 5B:
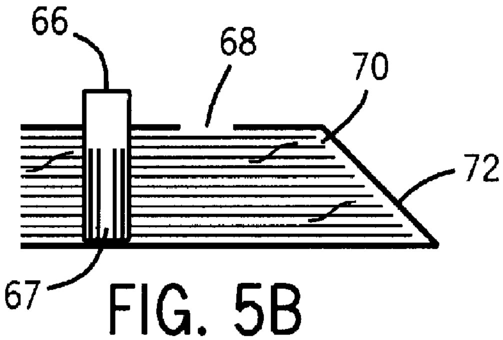
FIG. 5B is a cross-sectional view of a composite support structure showing a metal fastener, an abraded surface, and an angled edge with conductive tape in accordance with an embodiment of the present technique.

Referring now to FIGS. 5A and 5B, a composite material 60 is shown in FIG. 5A and corresponding techniques for creating conductive entrance paths into the composite material 60 are shown in FIG. 5B. The composite material 60 depicted in FIG. 5A has a non-conductive matrix 62, such as an epoxy, and conductive fibers 64, such as carbon fibers, oriented and bonded together and disposed in the matrix 62. The non-conductive matrix 62 may be any non-conductive material suitable for use in a composite matrix, and the conductive fibers 64 may be any type of conductive fibers, such as carbon or metal fibers. As depicted in FIG. 5B, conductive entrance paths may be created in the composite material. In one embodiment, a hole is drilled into the composite material and a metal part 66 with a toothed circumference 67, such as a metal fastener, is driven into the hole. The teeth 67 of the metal part 66 displace the matrix material 62 and contact the conductive fibers 64. For example, the conductivity between two such metal fasteners driven into the composite may be less than about 1 Ohm.

Alternatively, in other embodiments the matrix material 62 of the composite may be abraded, sanded, and/or machined at the surface to remove the matrix material 62 and expose the conductive fibers 64. The desired electrical components can be coupled to the abraded surface 68 to create a conductive path. For example, the resistance across a 40 cm plate of composite material can be reduced to about less than 20 Ohm by abrading the surface of the composite material. In some embodiments, the surface of the composite material 60 may be sanded, abraded, or machined at an angle to remove matrix material 62 and expose the conductive fibers 64. The angled surface 70 may be covered with a conductive tape 72 or other conductive material to tie the exposed fibers of the composite material together. In this embodiment, for example, the resistance at the angled area 70 may be reduced to about 5 Ohm. Further, any of the techniques described herein that create conductive paths in the composite material may be used in any combination depending on the use of the composite and the components coupled to the composite. For example, as discussed below, the toothed metal fasteners 66 may be useful for coupling a circuit board to the composite support structure. The angled surface 70 and conductive tape 72 may be useful when the composite support structure is further coupled to another support structure or the enclosure 30 of the x-ray detector 24.

It should be appreciated that the techniques and embodiments described above for creating conductive paths also provide a path for transferring thermal energy from various components coupled to the non-metallic support structures. Although non-metallic materials typically have relatively low thermal conductivity in conventional applications, the embodiments discussed herein that create conductive paths in a compounded plastic or composite material increase the thermal conductivity of the materials. For example, the thermal conductivity of the matrix material of a composite is very close to that of a typical plastic, at about 0.2 W/m·K, even though the fibers may have thermal conductivities near 100 W/m·K. The poor conductivity of the matrix material inhibits the flow of thermal energy into the layers of the composite, further reducing the effectiveness of the composite as a thermal conductor. In contrast, a conventional metal used to construct an electronics support structure may have a thermal conductivity about 100-200 W/m·K. Typical composites used to construct an electronic support structure, such as a composite laminated with oriented layers in which the direction of the orientation of the fibers provides a conductive path, have a thermal conductivity of about 4 W/mK to about 13 W/m·K depending on orientation. Using the techniques described herein, however, creating entrance paths in composite materials may advantageously result in conductivities between about 19 W/m·K and 24 W/m·K. In other words, by tapping into the internal conductive elements in these compounded plastics or composite materials, the disclosed embodiments enable those materials to be used effectively for both electrical and thermal conduction in electronic devices, such as imaging systems, thereby substantially reducing the weight of these electronic devices.

FIGS. 6 and 7 depict embodiments of the present technique having electrical components coupled to a generally non-metallic support structure of the x-ray detector 24, as described above. Referring now to FIG. 6, for example, two circuit boards 80 and 82 are shown coupled to a composite support structure 84 that may be disposed internally within the x-ray detector 24. The circuit boards 80 and 82 may include logic circuitry and/or other processing capabilities for controlling operation of an imaging panel and the x-ray detector 24. As discussed above with regard to FIG. 4B, toothed metal fasteners 86 and 87 are driven into holes in the composite support structure 84 to provide conductive entrance paths into the support structure 84. Circuit board 80 is coupled to support structure 84 by metal screw 88, and circuit board 82 is coupled to support structure 84 by metal screw 90. It should be appreciated that the circuit boards 80 and 82 and other components may be coupled to the support structure 84 through any number of screws or other fasteners as desired by the structural and electrical design of the circuit boards 80 and 82 or other components. A conductive path, e.g. a ground path, is created from the circuit board 80 to the circuit board 82, and to any system ground that may be coupled elsewhere to the support structure 84, through the conductive fibers 92 of the support structure 84. Further, any exposed solder points on the circuit boards 80 and 82 are insulated from the conductive path formed by the conductive fibers 92 by the non-conductive properties of the matrix material 94 of the composite support structure 84.

Turning now to the embodiment depicted in FIG. 7, circuit board 100 is coupled to a composite support structure 102 through the use of toothed fasteners 104 and 106 and conductive gap filling material 108 and 109. As discussed above, the toothed fasteners 104 and 106 are driven into holes in the composite support structure 102 to contact the conductive fibers 111 in the composite support structure 102. The metal fasteners 104 and 106 provide entrance paths to the conductive fibers 111 of the composite material. The circuit board 100 is coupled to the metal fasteners 104 and 106 through the use of conductive gap filling material 108 and 109 at the attachment points. The conductive gap filling material 108 and 109 enhances the conductive path created between the circuit board 100 and the metal fasteners 104 and 106 and therefore the composite support structure 102. The conductive path may conduct electricity and thermal energy away from the circuit board 100 and throughout the rest of the composite support structure 102. The circuit board 100 is insulated from the conductive path by the non-conductive surface of the composite support structure 102.

Further, support structure 102 has a sanded, abraded, or machined surface 110 at one end of the support structure 102. As discussed above, the abraded angled surface 110 exposes the conductive fibers 111, and conductive tape may be applied to the angled area to tie the exposed fibers together and enhance conductivity at the entrance path. Further, as depicted in FIG. 7, the support structure 100 is coupled to a wall 112 of the x-ray detector 24. The wall 112 and/or the enclosure 30 may be formed entirely or substantially of a compounded plastic, a composite material, or another conductive/non-conductive matrix type of material composition as discussed in detail above. The wall 112 may be the wall of the enclosure 30 or it may be another internal wall inside the x-ray detector 24. In this embodiment, the wall 112 of the x-ray detector 24 is formed from a compounded plastic having conductive elements. However, the wall 112 may be any non-metallic or metallic material capable of conducting electricity and heat. To further dissipate the thermal energy generated during operation of the x-ray detector, the angled entrance path 110 of the composite support structure 102 is coupled to the compounded plastic wall 112, creating a conductive path to the wall 112. This conductive path allows for thermal energy to conduct away from the circuit board 100 through the composite support structure 102 and then throughout the wall 112. In this manner, coupling of the circuit board 100 to the composite support structure 102 in combination with the conduction path created between the composite support structure 102 and the wall 112 provide greater dissipation of thermal energy or heat generated during operation of the x-ray detector.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for conducting electricity and thermal energy in an imaging system, comprising:

providing a conductive path between a plurality of components and a support structure of the imaging system, wherein the support structure comprises a material consisting essentially of conductive elements disposed in a non-conductive material.

2. The method of claim 1, wherein providing the conductive path comprises extending a conductive interface structure into the support structure to engage the conductive elements.

3. The method of claim 2, wherein extending the conductive interface structure comprises inserting or overmolding a conductive stud in the support structure.

4. The method of claim 2, comprising applying a conductive interface material to the conductive interface structure.

5. The method of claim 2, comprising coupling a circuit board to the support structure via the conductive interface structure.

6. The method of claim 1, wherein providing the conductive path comprises abrading a non-conductive surface of the support structure to reveal a conductive surface having at least some of the conductive elements exposed.

7. The method of claim 6, comprising applying a conductive interface material to the conductive surface.

8. The method of claim 1, wherein the imaging system comprises an x-ray detector.

9. The method of claim 1, wherein the non-conductive material comprises a plastic resin and the conductive elements comprise metal fibers.

10. The method of claim 1, wherein the non-conductive material comprises polycarbonate, or the conductive elements comprise carbon fibers, or carbon powder, or stainless steel fibers, or a combination thereof.

11. The method of claim 1, wherein the support structure consists essentially of a carbon fiber epoxy composite.

12. The method of claim 1, wherein the material is a compounded plastic.

13. The method of claim 1, wherein the material is a composite material.

14. The method of claim 1, wherein providing the conductive path comprises penetrating a non-conductive exterior of the material to create the conductive path to the conductive elements.

15. An imaging system, comprising:

a support structure comprising a material consisting essentially of conductive elements disposed in a non-conductive material, wherein the material has a non-conductive exterior; and a conductive path extending through the non-conductive exterior to engage the conductive elements, wherein the conductive path is configured to conduct heat, electricity, or a combination thereof, with one or more components of the imaging system.

16. The system of claim 15, wherein the conductive path comprises an overmolded part in the material.

17. The system of claim 15, wherein the conductive path comprises an abraded surface of the material.

18. The system of claim 15, comprising a circuit board coupled to the support structure via the conductive path.

19. The system of claim 15, comprising an imaging panel coupled to the support structure via the conductive path.

20. The system of claim 19, wherein the imaging panel comprises an x-ray detector panel.

21. The system of claim 19, wherein the imaging panel and the support structure are disposed in a portable panel-shaped housing.

22. The system of claim 15, wherein the non-conductive material comprises a plastic resin and the conductive elements comprise metal fibers.

23. The system of claim 15, wherein the material consists essentially of polycarbonate and stainless steel fibers.

24. The system of claim 15, wherein the material consists essentially of polycarbonate and carbon fibers.

25. The system of claim 15, wherein the material is a compounded plastic.

26. The system of claim 15, wherein the material is a composite material.

27. An imaging system, comprising:

a portable panel-shaped housing;

a support structure comprising a compounded plastic, or a composite material, or a combination thereof; and a conductive path penetrating a non-conductive exterior to a conductive interior of the compound plastic or the composite material, or the combination thereof; and an imaging panel coupled to the support structure via the conductive path.

* * * * *